(12) United States Patent
Bingol et al.

(10) Patent No.: US 9,628,810 B1
(45) Date of Patent: Apr. 18, 2017

(54) RUN-LENGTH ENCODED IMAGE DECOMPRESSOR FOR A REMOTE DESKTOP PROTOCOL CLIENT IN A STANDARDS-BASED WEB BROWSER

(71) Applicant: Dell Products L.P., Round Rock, TX (US)

(72) Inventors: Evren Bingol, San Francisco, CA (US); Curtis J. Schwebke, Los Gatos, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/930,323

(22) Filed: Nov. 2, 2015

(51) Int. Cl.
*G06K 9/00* (2006.01)
*H04N 19/186* (2014.01)
*H04N 19/93* (2014.01)

(52) U.S. Cl.
CPC ........... *H04N 19/186* (2014.11); *H04N 19/93* (2014.11)

(58) Field of Classification Search
CPC ...... H04N 19/13; H04N 19/14–19/157; H04N 19/164; H04N 19/186; H04N 19/188; H04N 19/48; H04N 19/66; H04N 19/91; H04N 19/93; H04N 21/236; H04N 21/23605; H04N 21/42653; H04N 21/4343–21/4344; H04N 21/4346; H04N 21/4355; H04N 21/43615; H04N 21/4363; H04N 21/43637; H04N 21/4402; H04N 21/4427; H04N 21/4435; H04N 21/4621; H04N 21/2343; H04N 21/2393; H04N 21/4143; H04N 21/437; H04N 21/4622; H04N 21/4782; H04N 21/64322; H04N 21/8193; H04N 21/8543; G06T 1/60; G06T 9/00; G06T 9/005; G06K 9/4652; G06K 2215/0051; H04L 1/0083; H04L 5/0037; H04L 5/4069; H04L 5/60; H04L 5/608; H04L 12/40071; H04L 12/4035; H04L 67/02; H04L 69/162; H04W 84/18; G06F 3/1454; G06F 3/1462; G06F 9/4445; G06F 17/2247; G09G 2340/02; G09G 2370/027

See application file for complete search history.

(56) References Cited

U.S. PATENT DOCUMENTS

| | | | | |
|---|---|---|---|---|
| 7,839,860 B2 * | 11/2010 | Kobayashi | ............ | G09G 5/006 370/395.2 |
| 7,853,121 B2 * | 12/2010 | Yahata | ............... | H04N 21/8586 360/60 |
| 8,509,555 B2 * | 8/2013 | Meany | ................... | H03M 7/40 382/246 |

(Continued)

*Primary Examiner* — Jose Couso
(74) *Attorney, Agent, or Firm* — Baker Cotts L.L.P.

(57) ABSTRACT

A web client may receive a run-length encoded packet of graphics data from a Remote Desktop Protocol server via a web-socket server. The web client may determine a run-length encoding algorithm for the packet based on a first color space associated with the packet. The web client may decompress the packet based on the determined run-length encoding algorithm, where decompressing the packet involves determining a plurality of commands to be performed on a canvas associated with the web client. The web client may render the graphics data on the canvas using the plurality of commands, wherein the graphics data is associated with a graphical interface for viewing and interacting with a remote desktop.

20 Claims, 6 Drawing Sheets

(56) References Cited

U.S. PATENT DOCUMENTS

| | | | | |
|---|---|---|---|---|
| 8,887,060 B2* | 11/2014 | Maity | ................... | G06F 9/4445 |
| | | | | 370/392 |
| 2014/0040767 A1* | 2/2014 | Bolia | .................... | G06F 3/1454 |
| | | | | 715/751 |
| 2014/0185950 A1* | 7/2014 | Saint Macary | ........ | H04N 19/91 |
| | | | | 382/251 |
| 2015/0207904 A1* | 7/2015 | Siegman | ............ | H04N 21/2343 |
| | | | | 709/217 |

* cited by examiner

RUN-LENGTH ENCODED IMAGE DECOMPRESSOR FOR A REMOTE DESKTOP PROTOCOL CLIENT IN A STANDARDS-BASED WEB BROWSER

TECHNICAL FIELD

This disclosure relates generally to a decompressor for a remote desktop protocol client (RDP) and, more particularly, to run-length encoded image decompressor for an RDP client in a web browser, such as a standards-based web browser.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

In desktop virtualization or remote working environments, a remote server provides desktop and application resources to a user. The desktop or application resources are published to the user's computing device by way of a protocol, such as the remote desktop protocol (RDP). The remote desktop or application may be displayed on a user's computing device using a web browser, such as a standards-based web browser. However, standards-based web browsers have limited support for graphics formats, and are not capable of natively rendering the graphics information contained in an RDP data packet. To provide access to a remote desktop or application resource using a standards-based web browser, an implementation of RDP graphics in a standards-based web browser is used. Because RDP graphics are compressed using run-length encoding, a decompressor is needed to display the graphics in a web browser. The present invention provides an efficient decompressor for displaying graphics in a web browser.

Traditionally, RDP clients are written in a native, full-featured programming language such as C or C++. In such an environment, the native RDP client may utilize an operating system's graphics library to display graphics information. Many operating systems support 8, 16, 24 and 32-bit color spaces. For such operating systems, it is unnecessary to convert between color spaces when RDP graphics data in 8, 16, 24, or 32-bit color space is received from the remote server. However, web browsers compatible with hypertext markup language (HTML) 5 (HTML5) and CANVAS only support a 32-bit color space. Thus, it is necessary to convert graphics received in an 8, 16, or 24-bit color space to a 32-bit color space for rendering by a web browser. But, it may be difficult to accomplish color space conversion in a scripting language such as JAVASCRIPT as the environment runs within a limited host environment provided by the web browser where the operating systems graphics library is not accessible and does not permit pointer operations and manipulations. The present invention provides for drawing or rendering images, such as graphical data comprising, for example, audio or video, or content within such an environment.

SUMMARY

In one embodiment, a packet is received at a web client, where the packet comprises graphics data. The graphics data may be any type of graphics data including, but not limited to, audio data, video data, and teleconferencing data. The packet may be a Protocol Data Unit (PDU). The packet is encoded using run-length encoding. The web client may receive the packet from a remote desktop protocol (RDP) server via a web-socket server. A run-length encoding algorithm for the received packet is determined based, at least in part, on a first color space associated with the packet. It is determined if the first color space is supported and the decompressed packet is converted from the first color space to the supported color space if the first color space is not supported. The first color space may be an 8-bit, 16-bit, 24-bit or 32-bit color space. The second color space may be a 32-bit color space; the color space supported by hypertext markup language 5 (HTML5) and CANVAS. The packet is decompressed based, at least in part, on the determined run-length encoding algorithm. Decompressing the packet includes determining a plurality of commands to be performed on a canvas associated with the web client. The decompressed packet is converted by using a selected color space algorithm, wherein the selected color space algorithm is based, at least in part, on the first color space and the supported color space. The packet is decompressed by determining a selected color space algorithm, where the selected color space algorithm is based, at least in part, on the first color space and the supported color space. The packet may be decompressed using a scripting language, such as HTML5. The graphics data of the decompressed packet is rendered on the canvas using the plurality of commands. The graphics data is associated with a graphical interface for viewing and interacting with a remote desktop.

In one embodiment an information handling system comprises one or more processors and a memory coupled to the processors comprising instructions executable by the processors, the processors operable when executing the instruction to perform or implement one or more embodiments. In one embodiment, one or more computer-readable non-transitory storage media embodying software that is operable when executed performs or implements one or more embodiments.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
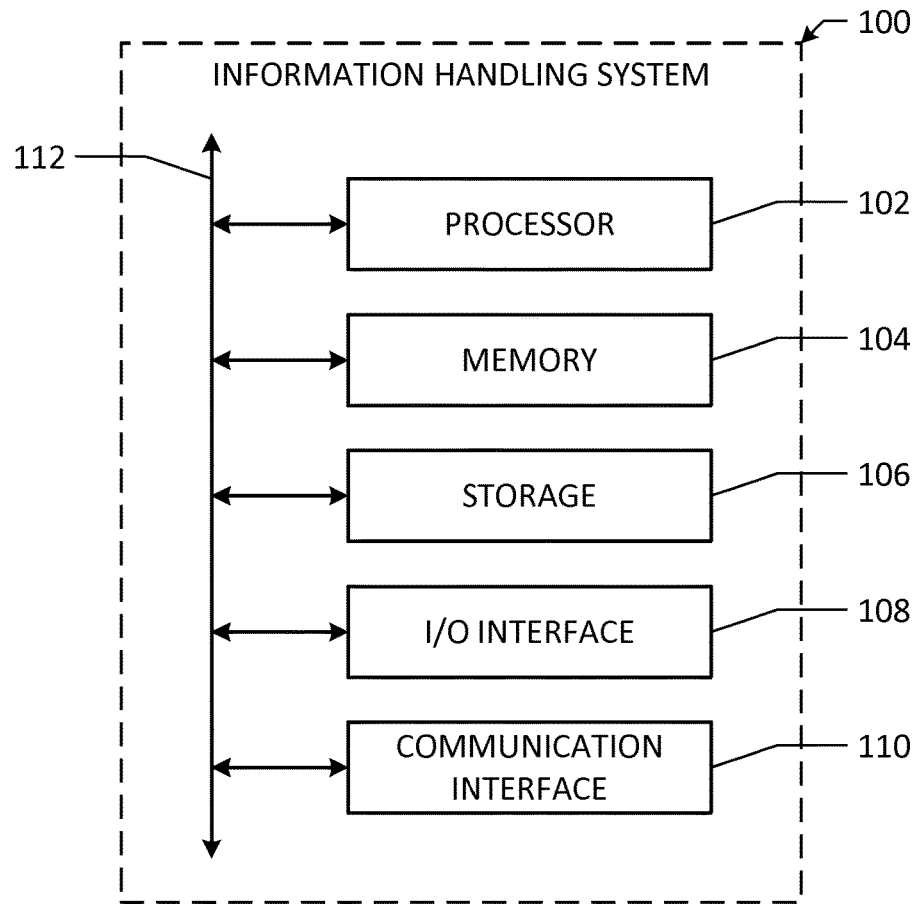
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In many instances, a remote desktop or application is displayed on an I/O device of a client associated with a user using a web browser, such as a standards-based web browser. A remote server provides desktop and applications resources to the client. The desktop or application resources are published to the user's computing device by way of a protocol, such as the remote desktop protocol (RDP). Many web browsers, such as standards-based web browsers, have limited support for graphics formats and may not be capable of natively rendering the graphics information contained in a RDP data packet. To provide access to a remote desktop or application resource using a standards-based web browser, an implementation of RDP graphics in a standards-based web browser is used. Because RDP graphics are compressed using run-length encoding, a decompressor is needed to display the graphics in a web browser. It may be advantageous to determine the color space and run-length encoding algorithm of a received packet. The packet may then be decompressed at the client using this information and the graphics data or content rendered at the I/O device at the client. The standards-based web-browser may also have limited support for graphics formats and may not be capable of natively rendering graphics information contained in an RDP data packet. For example, native RDP graphics support various size color spaces (8, 16, 24, and 32-bit) while an HTML5 CANVAS compatible web browser only supports a 32-bit color space. To provide access to a remote desktop or application resource using a standards-based web browser, real-time color space conversion to convert graphics to a 32-bit color space is required. Thus, it is necessary to convert graphics received in any color space other than a 32-bit color space for rendering by the web browser. Array indexes may be calculated instead of using pointer operations to perform such conversion as a scripting language, such as JAVASCRIPT, does not permit pointer operation.

Further, scripting languages run in a limited environment provided by the web browser which does not generally permit access to all of an operating system's libraries, such as the graphics library. Thus, the scripting language must transform the graphics described by the RDP data packet into constructs that are understandable by a web browser. The web browser then can utilize the operating system's graphics library to present the graphics to the user. The RDP packet is decompressed, a color space conversion is applied and the resulting graphics content is drawn on CANVAS for access by a user at a client.

Particular embodiments are best understood by reference to FIGS. 1-7, wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
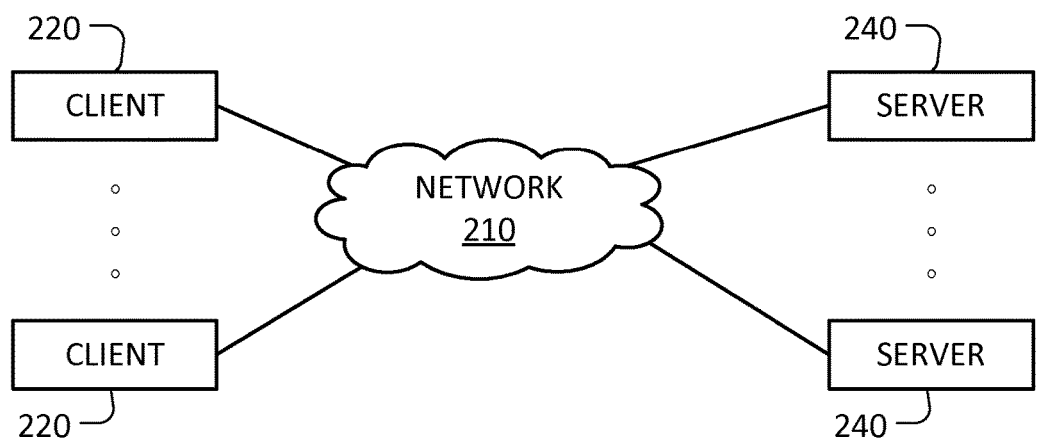
FIG. 2 is an example of a network environment.

FIG. 2 illustrates an example configuration of networked information handling systems (e.g., client devices and servers). In particular embodiments, one or more client devices 220 and one or more servers 240 are connected via network 210. Network 210 may be a public network or a private (e.g., corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g., a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g., corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

It may be desirable, in the case of a private (e.g., corporate) network including multiple sites or subnets to deploy software (including, e.g., all or part of one or more operating systems, applications, add-ons, or data) to one or more client devices 220 across one or more sites or subnets. The client devices 220 may, for example, be located remotely from one or more servers 240 (including, e.g., device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (e.g., videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more client devices 220 (e.g., thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (e.g., automatically) device discovery, tracking of assets (e.g., hardware or software inventory) at client devices, monitoring the status or health of client devices, applying one or more policies to client devices (including, e.g., network settings of the client devices), or remote administration and shadowing of client devices. The device manager may deliver any suitable resources including, for example, operating systems, add-ons, content, or any other suitable data, applications, or images to one or more thin client devices 220 of network 210.

In particular embodiments, a client device such as client device 220 (e.g., a thin client) may be designed with minimal or limited storage capacity (e.g., in a hard disk). The client device may be required, however, to run an operating system such as WINDOWS EMBEDDED or WINDOWS SERVER, but the footprint of such an operating system may grow over time with newer releases or updates. Hence, client devices may, over time, begin to run low on free storage space (e.g., in the hard disk). Unwanted files may be deleted or full volume compression of the storage medium (e.g., the hard disk) may be implemented to increase available storage space. However, full volume compression may introduce performance shortcomings (e.g., increased number of instruction cycles required to compress/uncompress data in the volume) from the point of view of an end user of the client device. In particular embodiments, optimized volume compression may be implemented to reduce effective disk usage on a client device while minimizing impact on system performance.

Figure 3A:
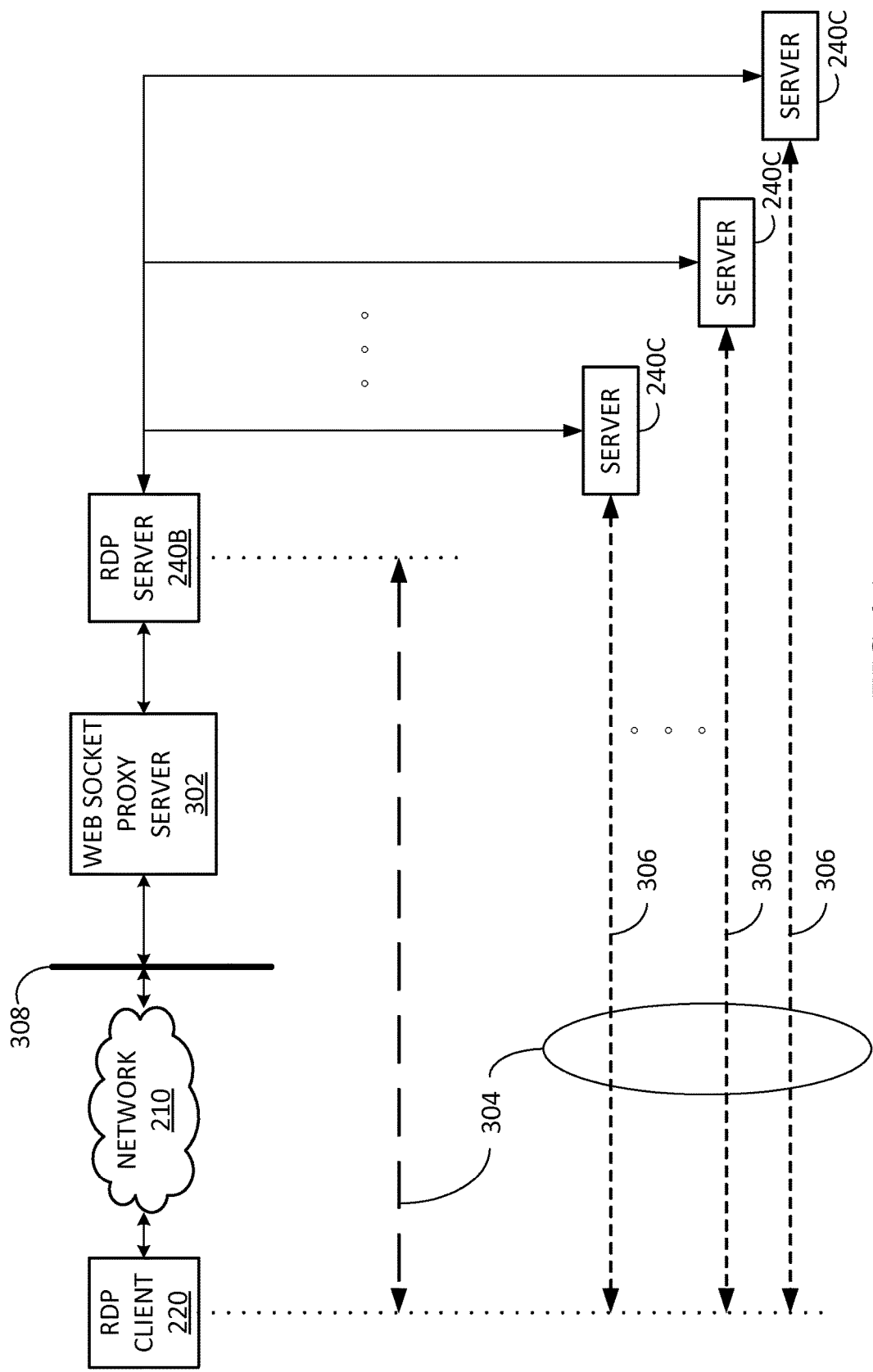
FIG. 3A is an example of a network environment utilizing Remote Desktop Protocol.

FIG. 3A illustrates a network environment utilizing an application that has virtual channels, which provides a data pathway using a provision of an existing protocol. As an example and not by way of limitation, such an application may be a client device 220 where client device 220 may be an RDP client 220. In particular embodiments, RDP client 220 may be a personal computer, a laptop computer, a thin client, a mobile device, or any other information handling system with an RDP client protocol implementation. In particular embodiments, RDP client 220 may be associated with one or more sites (e.g., subnets) of network 210. In particular embodiments, communication to servers 240, for example, server 240A, RDP server 240B and server 240C, may occur through one or more trusted and secure private networks. As an example and not by way of limitation, the trusted and secure private networks may be associated with one or more enterprise networks. In particular embodiments, RDP client 220 of network 210 may not be secure or trusted. For example, RDP client 220 may be a customer's device, a website visitor's device, or an employee's device (such as in a "bring your own device" environment). As an example and not by way of limitation, network 210 may comprise a public network, such as the Internet, or a third-party network. Network 210 may be untrusted, for example the network may have substantially low security. In order to protect servers 240 against potential security threats from network 210 and RDP client 220, a firewall 308 may establish one or more barriers that screen incoming and outgoing data traffic between servers 240 and RDP client 220. In particular embodiments, firewall 308 may comprise one or more of a software-based network security system or a hardware-based network security system that screen the data traffic according to one or more pre-determined routing rule-sets. In particular embodiments, firewall 308 may comprise one or more network security systems developed by Microsoft Corporation. Furthermore, servers 240 may be deployed using Microsoft Enterprise servers. Herein, reference to the network security systems developed by Microsoft Corporation includes, but is not limited to, Microsoft Enterprise-based firewalls.

Web socket proxy server 302 may facilitate communications between RDP client 220 via network 210 to RDP server 240B. In particular embodiments, RDP server 240B may be a Microsoft Windows server providing Remote Desktop Services. In particular embodiments, RDP server 240B may comprise a device manager that manages RDP client 220, as described above. In particular embodiments, servers 240C may include one or more services that a client-side operation may desire to connect to, or other servers that provide services to be accessed by a client, such as RDP client 220, applications co-located with RDP client 220, a port-forward within RDP client 220, or virtual network through RDP client 220. For example, servers 240C may comprise Microsoft Windows servers, Microsoft Enterprise servers, UNIX/LINUX servers, etc. Examples of services provided by servers 240C include, but are not limited to, file sharing, video streaming, audio streaming, database access, instant messaging, telephony, or video conferencing.

RDP client 220 may create one or more RDP virtual channels 304 between RDP server 240 and RDP client 220 over an established RDP connection. An application at the server 240 may then communicate with RDP client 220 through the virtual channel 304. Virtual channel 304 may be utilized to stream video data that includes both audio and video. For example, a user may desire to play an audio stream provided by a server 240 using an audio player application concurrently running on RDP client 220. To provide access to the remote audio stream, a gateway client located within RDP client 220 may establish a tunnel and channel using a specialized gateway service attachment through RDP virtual channel 304 to RDP server 240. The RDP server 240 may utilize a plug-in that converts all video files to be sent to RDP client 220 as a video streaming data with virtual channel tags. In one embodiment, more than one virtual channel is established. For example, audio may be communicated over one virtual channel 306 while video is communicated over another virtual channel 306. One or more virtual channels 306 may be a subset of virtual channel 304 such that only one virtual channel is established between RDP client 220 and RDP server 240. In one embodiment, the audio data or the video data may have higher priority. For example, video data may have a higher priority than the audio data. When the RDP client 220 receives the video data it runs the video data through a queue and determines that the video data has a high priority so RDP client 220 adds the video data to a video worker thread and then adds the audio data to an audio worker thread.

Figure 3B:
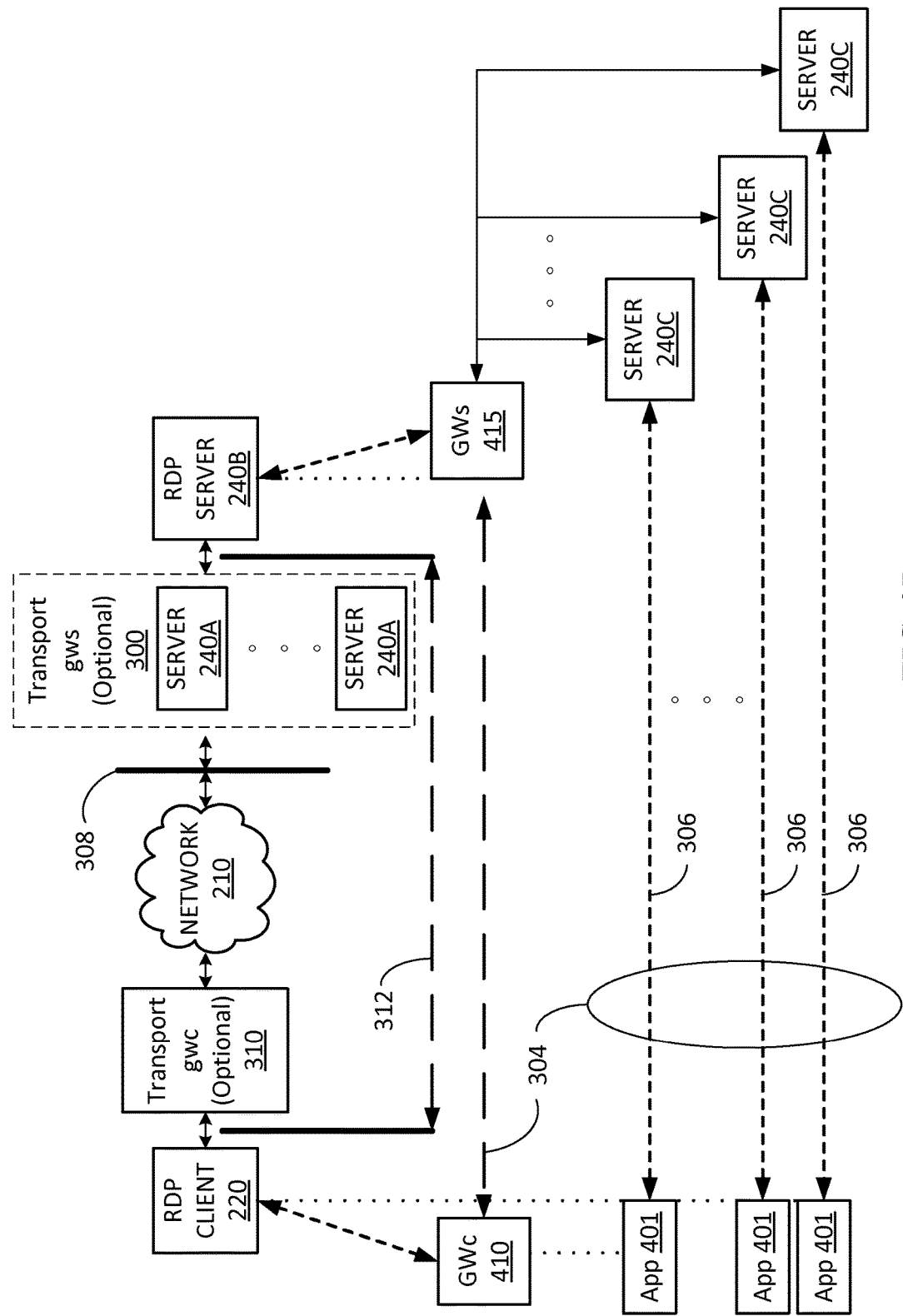
FIG. 3B is an example of a network environment utilizing Remote Desktop Protocol.

In the example network environment of FIG. 3B, one or more RDP virtual channels is used to create a virtual private network between RDP client 220 and one or more servers 240C, by attaching gateway functions (gateway client (GWc)//gateway server (GWs)) to each end of the RDP virtual channels. In a particular embodiment, firewall 308 is configured to permit an inbound RDP connection from RDP client 220 to RDP server 240B. After establishing the RDP connection (RDP client 220//RDP server 240B) 312, RDP client 220 may create one or more RDP virtual channels 304 over the established RDP connection. For example, a user may desire to play an audio stream provided by a server 240C using an audio player application concurrently running on RDP client 220. To provide access to the remote audio stream, GWc 410 located within RDP client 220 may establish a tunnel and channel using specialized GWs 415 attachment through RDP virtual channel connection 304 to RDP server 240B and again through specialized GWs 415 terminating the RDP server virtual channel. RDP server 240B may be configured to permit such a request to specialized GWs 415 functionality on the RDP server 240B. GWs 415 attached to RDP virtual channel 304 may provide access to the stream hosted by server 240C using any acceptable means. The stream may be tagged as a virtual channel so that it may be appropriately processed at RDP client 220. For example, in response to a request from GWc 410 connected to a virtual channel within RDP client 220, RDP server 240B may use virtual channel 304 to stream encoded packets in such a manner that the RDP server 240B through GWs 415 routes appropriately to a server 240C the machine that hosts the audio stream. Specialized GWs 415 connected to a virtual channel linked to RDP server 240B's virtual channel to GWc 410 may also streak packets received from server 240C over the RDP virtual channel 304 and routed to player application on RDP client 220. For example, a local port may be configured to stream packets received from the audio player to server 240C over the RDP virtual channel 304, with all sourcing, sinking and routing determined by GWc 410 and GWs 415 attachments at alternate ends of the RDP virtual channel 304. In this fashion, the RDP client 220 may also stream packets received from server 240C over the RDP virtual channel 304 back to the local port to the audio player (again through GWc 410//GWs 415 tunnel protocol).

In another particular embodiment, a transport gateway may be used to provide access to a remote service. For example, an application running on RDP client 220 may require access to a service provided by server 240C. A gateway client (gwc 310) may be provided on RDP client 220. A corresponding gateway server (gws 300) may be provided network access of RDP server 240B, the server 240C providing the target service, or on a different server 240C. RDP client 220 may request an RDP virtual channel 304 on the established RDP connection 312 to RDP server 240B. On the RDP client 220, the GWc 410 and GWs 415 are bound to the RDP virtual channel 304. On RDP server 240B, the RDP virtual channel 304 is bound to the GWs 415. The application is then able to communicate with the remote service through the connection pathway. The connection pathway utilizing virtual channel through RDP connection 312 may be denoted as GWc 410/RDP client 220//RDP server 240B/GWs 415 when a transport gateway is also utilized, the connection pathway may be described as GWc 410/RDP client 220/gwc 310//gws 300/RDP server 240B/GWs 415 when the transport gateway is utilized. "/" is used to denote a local binding, and "//" is used to denote a remote binding.

In other particular embodiments, only a GWc 410 or a GWs 415 may be provided. For example, an application on RDP client 220 may not require a separate transport gateway client to access a transport gateway server. In such an embodiment, the application connects directly to the transport gateway server. Other particular embodiments are described with reference to FIG. 3B. RDP client 220 may connect to RDP server 240B via firewall 308 and gws 300. In particular embodiments, gws 300 may comprise one or more of a proxy server (e.g., web proxy) or a connection manager. The proxy server or connection manager may be operated by one or more servers 240A. The proxy server may act as an intermediary for data transfer between RDP client 220 and RDP server 240B.

In particular embodiments, gws 300 may utilize Microsoft's Tunneling Service to allow RDP client 220 to establish a tunnel to servers 240B or 240C (e.g., MICROSOFT ENTERPRISE servers) via firewall 308 (e.g., MICROSOFT ENTERPRISE-based firewall). MICROSOFT'S TUNNELING SERVICE is an HTTPS-based tunneling service role that supports tunneling RDP connections. As an example and not by way of limitation, gws 300 by use of gwc 310 may encode the RDP data packets, serialized for transmission over HTTPS, received from RDP client 220 and translate the data packets into native RDP data packets (also known as RDP protocol data units) for use by RDP server 240B. In the example network environment of FIG. 3, gws 300 may consist of one or more servers 240A. In particular embodiments, RDP server 240B may be an RDP session host such that RDP client 220 may connect to the RDP server 240B. After establishing the RDP connection 312, RDP client 220 may create one or more RDP virtual channels 304 over the established RDP connection and attach specialized gateway protocol to each end of the virtual channels (GWc 410//GWs 415) and open connection gateway 306 to specified server. For example, gateway 306 is a subset of RDP virtual channel gateway 304 in that packets transmitted over gateway 306 are tagged as virtual channel packets and are communicated over the established connection 304. For example, a user may desire to play an audio stream provided by a server 240C using server message blocks (SMBs) on a server and using an audio player application concurrently running on RDP client 220. To provide access to the remote audio stream, RDP client 220 may request a RDP virtual channel 304 on the established connection 312 to RDP server 240B. RDP server 240B may be configured to permit such a request through GWc 410 and GWs 415 at each end of virtual channel. RDP server 240B may provide access to the stream hosted by server 240C through GWc 410 and GWs 415 using any acceptable means, such as port forwarding. For example, in response to a request from RDP client 220, RDP server 240B may configure a port forward from an RDP client 220 that is a host to RDP server 240B such that packets received from the RDP virtual channel's gateway 306 are forwarded from RDP client 220 to the server 240C that hosts the audio stream. RDP server 240B may also configure a port forward such that packets received from server 240C are forwarded over the RDP virtual channel 304 through the GWc 410//GWs 415 definitions to enable complete communication. Similarly, RDP client 220 may use port forwarding to give an audio player running concurrently with the RDP client 220 on RDP client 220 access to the audio stream. For example, a local port may be configured to forward packets received from the audio player to server 240C over the RDP virtual channel's GWc 410//GWs 415 attachments. The RDP client 220 may also forward packets received from server 240C over the RDP virtual channel gateway 304 to the local port to the audio player. The connection pathway may be denoted AudioPlayer(smbClient):GWc 410/RDP client 220//RDP server 240B/GWs 415:smbHost or AudioPlayer(smbClient): GWc 410/RDP client 220/gwc 310/gws 300/RDP server 240B/GWs 415:smbHost where gwc 310 has corresponding connection to transport gws 300. In particular embodiments, the GWc 410 is integrated with the RDP client software.

In another particular embodiment, a gateway may be used to provide access to a remote service. For example, an application running on RDP client 220 may require access to a service provided by server 240C. A gwc 310 may be provided on RDP client 220. A corresponding gateway server may be provided on RDP server 240B (gws 300), the server 240C providing the target service, or on a different server 240C. After RDP client 220 and RDP server 240B are connected, RDP client 220 may request an RDP virtual channel 304 on the established RDP connection 312 to RDP server 240B with corresponding tunnel channel through GWc 410//GWs 415 pair at each end of virtual channel 304. On the RDP client 220, the gateway client is bound to the RDP virtual channel 304. On RDP server 240B, the RDP virtual channel 304 is transparently attached through gws 300. The application is then able to communicate with the remote service through the connection pathway. The connection pathway may be denoted as GWc 410/RDP client 220/gwc 310//gws 300/RDP server 240B when the gateway server is provided beyond firewall 308 within scope of RDP server 240B. The connection pathway may be denoted as GWc 410/RDP client 220/gwc 310//gws 300/RDP server 240B/GWs 415 where GWc 410 and GWs 415 are virtual channel attachments and gws 300 may reside on a server other than RDP server 240B. In other particular embodiments, only a gateway client or a gateway server may be provided. For example, an application on RDP client 220 may not require a separate gwc 310 to access a gws 300. In such an embodiment, the application connects directly from RDP client 220 to RDP server 240B to establish a connection gateway through a virtual channel using GWc 410 and GWs 415.

In other particular embodiments, an Independent Computing Architecture (ICA) protocol supporting virtual channels may be used in place of the Remote Desktop Protocol. In such an embodiment, an ICA Client may be used in place of RDP client 220, and an ICA Server may be used in place of RDP server 240B. In other particular embodiments, HTTP may be used with a CONNECT method in similar fashion to virtual channels in RDP.

In particular embodiments, as described in connection with FIG. 4, an RDP client 220 may be implemented in a web browser, such as a standards-based web browser. A web-socket server may be used to connect the RDP client 220 implemented in a web browser to the RDP server 240B.

Figure 4:
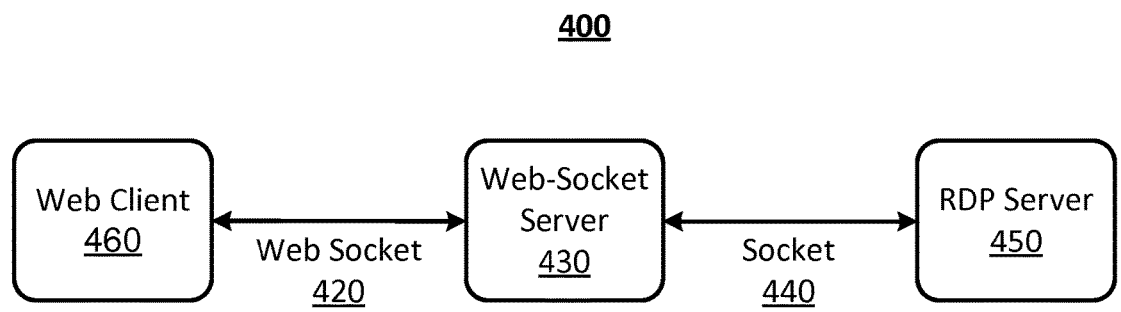
FIG. 4 is an example web-socket server environment.

FIG. 4 is an example web socket server environment 400. In particular embodiments, web socket server environment 400 may include a web client 460, web socket 420, web-socket server 430, socket 440, and RDP server 450. In particular embodiments, web client 410 may correspond to RDP client 220 and RDP server 450 may correspond to any one or more of or any combination of RDP servers 240A, 240B, 240C, described in connection with FIGS. 3A-3B. Web client 410 may be a standards-based web browser. Web-socket server 430 may be a proxy server, and web-socket server 430 may be implemented in C or C++ code.

Web-socket server 430 may facilitate connections between RDP server 450 and web client 410. Web client 460 may send one or more packets, for example, JAVASCRIPT packets, Protocol Data Units (PDUs), or any other suitable packets, over web socket 420. Web-socket server 430 may intercept the packets sent from web client 460 over web socket 420 and convert each packet into a socket format, which RDP server 450 may understand. Web-socket server 430 may open a socket 440 that connects with RDP server 450 and send the converted packets (e.g., in socket format) to RDP server 450 over socket 440. In particular embodiments, web-socket server 430 may intercept packets sent from RDP server 450 over socket 440, which may be in socket format. Web-socket server 430 may convert the packets into a web-socket format and send the converted packets over web socket 420 to web client 460. In this manner, web-socket server 430 may facilitate data transmissions and any other suitable communications between web client 460 and RDP server 450. The packets communicated to web client 410 may include instructions that cause web client 460 to act as an RDP client or to provide an RDP client, which may mean that the web client 460 may provide a graphical interface for presenting and interacting with a remote desktop. RDP server 450 may provide the remote desktop, which may be published to the web client 460 using an RDP via the connection facilitated by web-socket server 430.

Web client 460, web socket 420, web-socket server 430, socket 440, and RDP server 450 may perform any of the functions and have any of the attributes described in U.S. patent application Ser. No. 14/925,582 titled "Remote Desktop Protocol Client for a Standards-Based Web Browser," filed Oct. 28, 2015, which is incorporated by reference herein.

In particular embodiments, web client 460 may provide a run-length encoded image decompressor in order to render graphics information contained in packets received from RDP server 450 by way of web-socket server 430. In particular embodiments, the run-length encoded image decompressor may be provided in JAVASCRIPT. In particular embodiments, the run-length encoded image decompressor may be implemented in hypertext markup language 5 (HTML5) and CANVAS.

Figure 5:
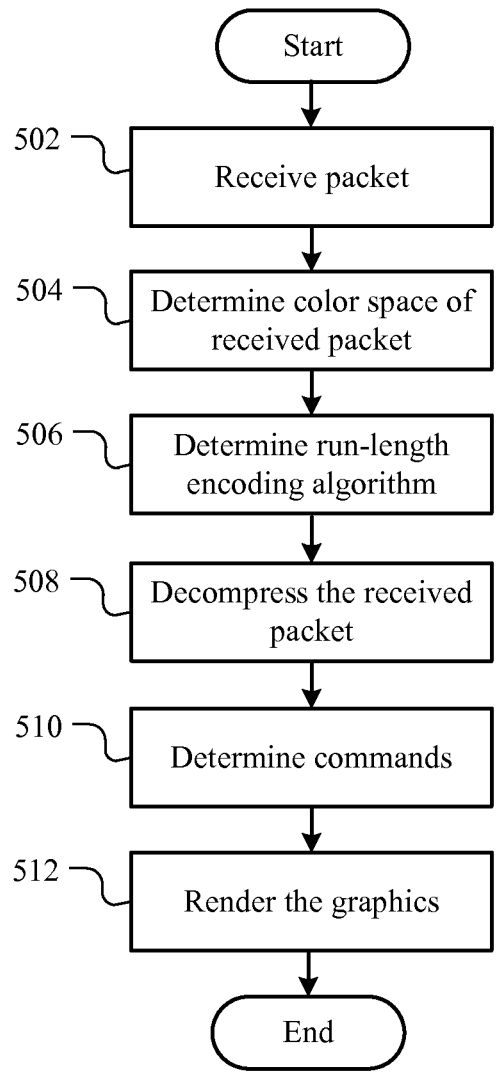
FIG. 5 is an example method according to one or more embodiments of the present disclosure.

FIG. 5 illustrates an example method 500 for providing a run-length encoding decompressor for a standards-based web client 460 according to one or more embodiments of the present invention. At step 502, web client 460 may receive a packet from RDP server 450 via web-socket server 430. The received packet may be a run-length encoded (RLE) packet—in PDU format and transmitted as a JAVASCRIPT packet. The received packet may contain RLE graphics data. The graphics data may comprise any one or more of audio data, video data, teleconferencing data, and any other type of graphics data known to one of ordinary skill in the art.

At step 504, the web client 460 determines the color space of the received packet. The color space may be sent from RDP server 450 as part of the header of the received packet. At step 506, the web client 460 determines the RLE algorithm for the received packet. The RLE algorithm may be based, at least in part, on the determined color space of the received packet. One or more RLE algorithms may be associated with a given color space. Each packet received has the identified color space and any associated information necessary for the run-length encoder to select the RLE algorithm.

At step 508, web client 460 may decompress the received packet based, at least in part, on the determined RLE algorithm. The web client 460 decompresses the received packet into one or more rows of a plurality of values, where each value corresponds to a color for a particular pixel. During decompression, web client 460 may use an indicator, such as a flag, to mark repetitive pixels in a row. Any such indicator known to one of ordinary skill in the art may be used to mark repetitive pixels in a row. In one embodiment, a received packet comprises four black pixels in a row. Run-length encoding may flag the four black pixels as "B4" as opposed to "BBBB." A run-length encoded packet, such as a PDU, may be, for example, decompressed using a determined RLE algorithm as shown in Appendix A.

At step 510, the web client 460 determines a plurality of commands corresponding to the graphics to be drawn on the canvas, where the canvas is a hypertext markup language (HTML) <canvas> element which can be used to draw graphics using a scripting language, such as JAVASCRIPT. Determining the plurality of commands may, in one or more embodiments, be part of step 508. For example, Appendix B illustrates drawing graphics to a canvas.

At step 512, the graphics associated with the received packet are rendered. The graphics are rendered on the canvas based, at least in part, on the plurality of commands. The graphics associated with the received packet are now ready for display to a user interface associated with the web client 460 on a graphical interface, such as a monitor or any other graphical interface known to one of ordinary skill in the art, for viewing and interacting with the remote desktop.

Figure 6:
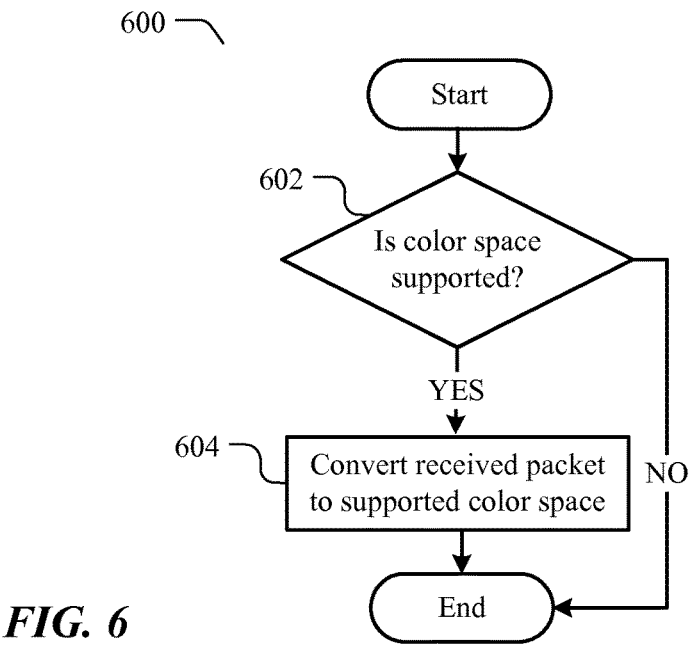
FIG. 6 is an example method according to one or more embodiments of the present disclosure.

FIG. 6 illustrates an example method 600 according to one or more embodiments of the present invention. After the web client 460 decompresses the run-length encoded received packet, web client 460 may determine at step 602 if the color space of the received packet is supported by the web client 460. If at step 602, it is determined that the color space of the received packet is not supported, then at step 604 the web client 460 may convert the received packet into a different color space that is supported by the web client 460. RDP supports various color spaces, for example, 8, 16, 24, and 32-bit color spaces. Web client 460 may support only one, a subset of the possible color spaces, or all of the possible color spaces. In one embodiment, web client 460 may support only one color space, for example, a 32-bit color space. Accordingly, web client 460 may convert the received packet that is encoded using a run-length encoding algorithm for a first color space (for example, 8-bit color space) to a packet that is encoded using a run-length encoding algorithm for a supported or second color space (for example, a 32-bit color space). The RLE algorithm uncompresses, for example, an 8-bit packet to an 8-bit uncompressed packet or a 16-bit packet to a 16-bit uncompressed packet, or a 24-bit packet to a 24-bit uncompressed packet. Then the uncompressed packet is converted to a 32-bit color space using a color space conversion.

The RLE algorithm may be based, at least in part, on either of the first color space or the second color space, whichever corresponds to a 32-bit color space. If a packet is already encoded for a 32-bit color space, then web client 460 may not need to perform any color space conversion. In one embodiment, the RDP server 450 sends packets with graphics data encoded for a smaller color space (for example, 8-bit color space) than for a larger color space (for example, 32-bit color space) even though the web client 460 only supports the larger color space as sending for a smaller color space may be faster.

As an example, web client 460 may receive a packet from web-socket browser 430. At step 602, web client 460 may identify the first color space of the packet (for example, read it from the header) and query the canvas associated with web client 460 to determine the second color space of the packet. If the first color space and the second color space are the same, no conversion needs to be performed. If the first color space and the second color space differ, for example, the first color space might be an 8-bit color space, and the second color space might be a 32-bit color space, then at step 604 web client 460 selects a color space conversion algorithm based, at least in part, on the first color space and the second color space (the color space to convert from and the color space to convert to) and may run the selected color space conversion algorithm to convert the packet to the second color space, the 32-bit color space. The color space conversion algorithm may be any suitable color space conversion algorithm. The selected color space conversion algorithm that is employed may depend on the conversion to be made. For example, the color space conversion algorithm for converting a 16-bit color space to a 24-bit color space differs from that for converting a 24-bit color space to a 32-bit color space. After the run-length encoded received packet has been converted into a supported color space, web client 460 may render the graphics information (e.g., an image) from the received packet as discussed with step 512 of FIG. 5. For example, the standards-based web browser at the web client 460 may now utilize the operating system's graphics library to present any graphics information to a display or I/O device at the web client 460.

Figure 7:
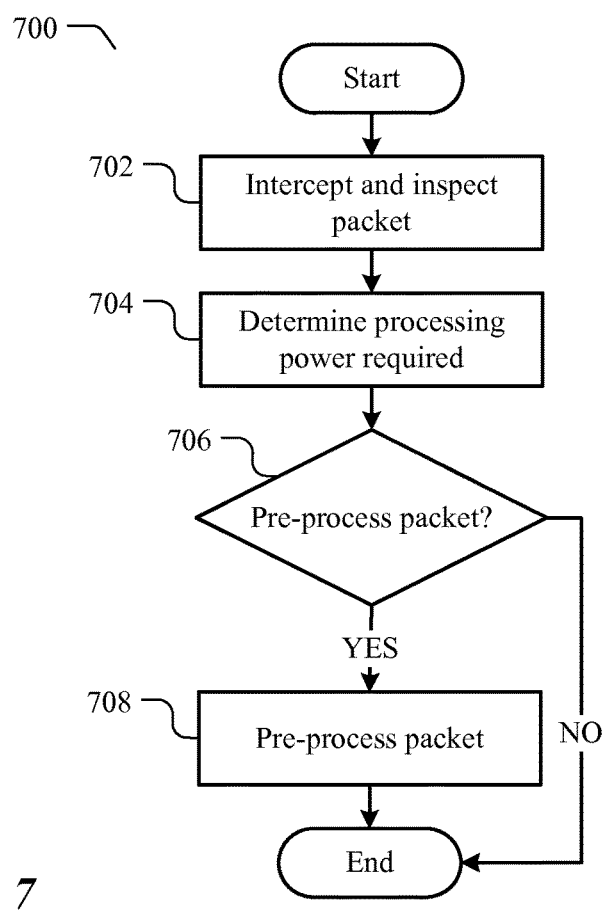
FIG. 7 is an example method according to one or more embodiments of the present disclosure.

FIG. 7 illustrates an example method 700 according to one or more embodiments of the present invention. In particular embodiments, it may be more efficient to perform pre-processing of a packet before the packet is sent to the web client 460. At step 702, web-socket server 430 may intercept and inspect a packet before sending the packet to web client 460. At step 704, web-socket server 430 determines the processing power of a packet received from the RDP server 450. The web-socket server 430 may inspect the packet and detect that the packet contains RLE encoded data and determine that the decompression may be performed at the web-socket server 430 which increases the performance at web client 460.

At step 706, the web-socket server 430 determines if the packet should be pre-processed at the web-socket server 430 before sending to the web client 460. That is, a packet may require too much processing power for web client 460 to handle (for example, it would be much slower for web client 460 to do a particular processing task). If it is determined that the packet should be pre-processed at web-socket server 430, then at step 708 the web-socket server 430 pre-processes the packet before sending it to web client 460. For example, web-socket server 430 may perform the run-length encoding expansion and convert the packet to a suitable format, such as a joint photographic experts group (JPEG) format or any other suitable format known to one of ordinary skill in the art, before sending the packet to web client 460. Web client 460 may then render the pre-processed received packet without having to perform any conversion to a different color space.

Although this disclosure describes and illustrates particular embodiments as being implemented by web client 460, this disclosure contemplates any suitable embodiments occurring on any suitable interface and as being implemented by any suitable platform or system. As an example, and not by way of limitation, particular embodiments may be implemented by web-socket server 430. Furthermore, although this disclosure describes and illustrates particular components, devices, or systems carrying out particular steps, this disclosure contemplates any suitable combination of any suitable components, devices, or systems carrying out any suitable steps of the method of FIG. 4.

Particular embodiments may repeat one or more steps of any method where appropriate. Although this disclosure describes and illustrates particular steps of as occurring in a particular order, this disclosure contemplates any suitable steps occurring in any suitable order. Moreover, although this disclosure describes and illustrates an example method for providing a run-length encoding decompressor for a standards-based web client 410, this disclosure contemplates any suitable method for providing a run-length encoding decompressor for a standards-based web client 410, including any suitable steps, which may include all, some, or none of the steps of the methods of FIG. 5, FIG. 6, and FIG. 7 where appropriate. Furthermore, although this disclosure describes and illustrates particular components, devices, or systems carrying out particular steps, this disclosure contemplates any suitable combination of any suitable components, devices, or systems carrying out any suitable steps.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a web client:
   receiving a packet, wherein the packet comprises graphics data, wherein the packet is encoded using run-length encoding, and wherein the packet is received from a Remote Desktop Protocol (RDP) server via a web-socket server;
   determining a run-length encoding algorithm for the packet based, at least in part, on a first color space associated with the packet;
   decompressing the packet based, at least in part, on the determined run-length encoding algorithm, wherein decompressing the packet comprises determining a plurality of commands to be performed on a canvas associated with the web client; and
   rendering the graphics data of the decompressed packet on the canvas using the plurality of commands, wherein the graphics data of the decompressed packet is associated with a graphical interface for viewing and interacting with a remote desktop.

2. The method of claim 1, further comprising:
   determining if the first color space is supported; and converting the decompressed packet from the first color space into a second color space, wherein the second color space comprises a color space supported by the web client.

3. The method of claim 2, wherein the first color space is an 8-bit, 16-bit, 24-bit, or 32-bit color space.

4. The method of claim 2, wherein the second color space is a 32-bit color space.

5. The method of claim 2, wherein converting the decompressed packet comprises running a selected color space algorithm, wherein the selected color space algorithm is based, at least in part, on the first color space and the second color space.

6. The method of claim 1, wherein the packet is a Protocol Data Unit.

7. One or more computer-readable non-transitory storage media embodying software that is operable when executed to:
   receive a packet at a web client, wherein the packet comprises graphics data, wherein the packet is encoded using run-length encoding, and wherein the packet is received from a Remote Desktop Protocol (RDP) server via a web-socket server;
   determine a run-length encoding algorithm for the packet based, at least in part, on a first color space associated with the packet;
   decompress the packet based, at least in part, on the determined run-length encoding algorithm, wherein decompressing the packet comprises determining a plurality of commands to be performed on a canvas associated with the web client; and
   render the graphics data of the decompressed packet on the canvas using the plurality of commands, wherein the graphics data of the decompressed packet is associated with a graphical interface for viewing and interacting with a remote desktop.

8. The media of claim 7, wherein the software is further operable when executed to:
   determine if the first color space is supported; and
   convert the decompressed packet from the first color space into a second color space, wherein the second color space comprises a color space supported by the web client.

9. The media of claim 8, wherein the first color space is an 8-bit, 16-bit, 24-bit, or 32-bit color space.

10. The media of claim 8, wherein the second color space is a 32-bit color space.

11. The media of claim 8, wherein converting the decompressed packet comprises running a selected color space algorithm, wherein the selected color space algorithm is based, at least in part, on the first color space and the second color space.

12. The media of claim 7, wherein the packet is a Protocol Data Unit.

13. An information handling system comprising:
   one or more processors; and
   a memory coupled to the processors comprising instructions executable by the processors, the processors operable when executing the instructions to:
      receive a packet at a web client, wherein the packet comprises graphics data, wherein the packet is encoded using run-length encoding, and wherein the packet is received from a Remote Desktop Protocol (RDP) server via a web-socket server;
      determine a run-length encoding algorithm for the packet based, at least in part, on a first color space associated with the packet;
      decompress the packet based, at least in part, on the determined run-length encoding algorithm, wherein decompressing the packet comprises determining a plurality of commands to be performed on a canvas associated with the web client; and
      render the graphics data of the decompressed packet on the canvas using the plurality of commands, wherein the graphics data of the decompressed packet is associated with a graphical interface for viewing and interacting with a remote desktop.

14. The information handling system of claim 13, wherein the processors are further operable when executing the instructions to:
   determine if the first color space is supported; and
   convert the decompressed packet from the first color space into a second color space, wherein the second color space comprises a color space supported by the web client.

15. The information handling system of claim 14, wherein the first color space is an 8-bit, 16-bit, 24-bit, or 32-bit color space.

16. The information handling system of claim 14, wherein the second color space is a 32-bit color space.

17. The information handling system of claim 14, wherein converting the decompressed packet comprises running a selected color space algorithm, wherein the selected color space algorithm is based, at least in part, on the first color space and the second color space.

18. The information handling system of claim 13, wherein the packet is a Protocol Data Unit.

19. The information handling system of claim 13, wherein the graphics data comprises audio data and video data.

20. The information handling system of claim 13, wherein the packet is decompressed using hypertext markup language 5 (HTML5).

* * * * *